(12) United States Patent
Huber et al.

(10) Patent No.: US 12,521,572 B2
(45) Date of Patent: Jan. 13, 2026

(54) MULTI-SYSTEM SYNCHRONIZATION FOR SURFACE-GUIDED RADIATION THERAPY

(71) Applicant: VARIAN MEDICAL SYSTEMS, INC., Palo Alto, CA (US)

(72) Inventors: Michael Huber, Beinwil am See (CH); Delena Hanson, St. George, UT (US); Rohit Kamthe, Munich (DE)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 295 days.

(21) Appl. No.: 18/376,462

(22) Filed: Oct. 4, 2023

(65) Prior Publication Data
US 2025/0114640 A1  Apr. 10, 2025

(51) Int. Cl.
*A61N 5/10* (2006.01)

(52) U.S. Cl.
CPC ......... *A61N 5/1067* (2013.01); *A61N 5/1037* (2013.01); *A61N 5/1049* (2013.01); *A61N 5/107* (2013.01); *A61N 2005/1061* (2013.01); *A61N 2005/1063* (2013.01); *A61N 2005/1074* (2013.01)

(58) Field of Classification Search
CPC ...... A61N 5/10; A61N 5/1037; A61N 5/1049; A61N 5/1067; A61N 5/107; A61N 2005/1061; A61N 2005/1063; A61N 2005/1074
See application file for complete search history.

(56) References Cited

U.S. PATENT DOCUMENTS

| | | |
|---|---|---|
| 2023/0149741 A1 | 5/2023 | Hirai et al. |
| 2024/0054646 A1* | 2/2024 | Sabel ............. G06T 7/0014 |
| 2024/0153134 A1 | 5/2024 | Kompatscher et al. |
| 2025/0114641 A1* | 4/2025 | Huber ............. A61N 5/1037 |

* cited by examiner

*Primary Examiner* — Jurie Yun
(74) *Attorney, Agent, or Firm* — SU IP CONSULTING

(57) ABSTRACT

An example computer-implemented method for a treatment delivery system is disclosed. The method includes transmitting, to a surface guidance system, a first signal indicating that delivery of radiation is beginning to a region of patient anatomy, wherein the radiation includes a first portion and a second portion. After delivering the first portion to the region, the method also includes receiving a second signal from the surface guidance system, wherein the interrupt signal is based on a reference surface generated in response to the first signal, and in response to the second signal, halting delivery to the region of the second portion of the radiation.

20 Claims, 13 Drawing Sheets

MULTI-SYSTEM SYNCHRONIZATION FOR SURFACE-GUIDED RADIATION THERAPY

CROSS-REFERENCE TO RELATED APPLICATION

The present application is related in subject matter to U.S. patent application Ser. No. 18/376,461, entitled "MULTI-SYSTEM SYNCHRONIZATION FOR OPTICAL SURFACE MONITORING," which is incorporated herein by reference.

BACKGROUND

Unless otherwise indicated herein, the approaches described in this section are not prior art to the claims in this application and are not admitted to be prior art by inclusion in this section.

Radiation therapy is a localized treatment for a specific target tissue (a planning target volume), such as a cancerous tumor. Ideally, radiation therapy is performed on a planning target volume that spares the surrounding normal tissue from receiving doses above specified tolerances, thereby minimizing risk of damage to healthy tissue. Prior to radiation therapy, an imaging system is typically employed to provide a three-dimensional image of the target tissue and surrounding area, referred to as the "treatment planning image." From such imaging, the size and mass of the target tissue can be estimated, a planning target volume determined, and an appropriate treatment plan generated.

So that the prescribed dose is correctly supplied to the planning target volume (i.e., the target tissue) during radiation therapy, before a radiation treatment session (or fraction), the patient is correctly positioned relative to the linear accelerator that provides the radiation therapy. Typically, an imaging system is used to view target tissues immediately before delivery of the radiation therapy so that the target tissues can be viewed using a reconstructed region of patient anatomy based on X-ray images of the target tissues. Further, in the case of surface guided radiation therapy (SGRT), during patient setup and treatment, stereo vision technology precisely tracks patient motion and aligns a patient body outline with a planned patient body outline throughout treatment by monitoring a patient's surface.

SUMMARY

According to various embodiments, the operation of multiple independent systems involved in SGRT is synchronized, so that user workflow during SGRT is streamlined. In some embodiments, a treatment delivery system transmits position information to an associated surface guidance system when couch position is changed, such as when moving the couch from a patient setup position to a patient treatment position, or when moving the couch from a first image acquisition position to a second image acquisition position. In such embodiments, the surface guidance system can automatically adjust the current position of a planned patient surface relative to the radiotherapy system. As a result, offsets between the current patient surface and the planned patient surface are accurately calculated, because repositioning of the couch is not interpreted by the surface guidance system as motion of the patient. In other embodiments, a treatment delivery system indicates to an associated surface guidance system that delivery of radiation to a region of patient anatomy is beginning. In such embodiments, the surface guidance system is automatically triggered to acquire a reference surface of the patient for use during SGRT, thereby obviating the need for a user to manually request acquisition of the reference surface.

In some embodiments, a computer-implemented method for a treatment delivery system includes: receiving an input requesting movement of a couch of the treatment delivery system from a first position to a second position; and in response to the input: transmitting, to a surface guidance system, position information for the couch, wherein the position information is for modifying a reference patient surface; and causing the couch to move from the first position to the second position.

In some embodiments, a computer-implemented method of radiotherapy for a treatment delivery system includes: transmitting, to a surface guidance system, a first signal indicating that delivery of a radiation dose is beginning to a region of patient anatomy, wherein the radiation dose includes a first portion and a second portion; after delivering the first portion to the region, receiving a second signal from the surface guidance system, wherein the interrupt signal is based on a reference surface generated in response to the first signal; in response to the second signal, halting delivery to the region of the second portion of the radiation dose.

Further embodiments include a non-transitory computer-readable storage medium comprising instructions that cause a computer system to carry out one or more of the above methods, as well as a computer system configured to carry out one or more of the above methods.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
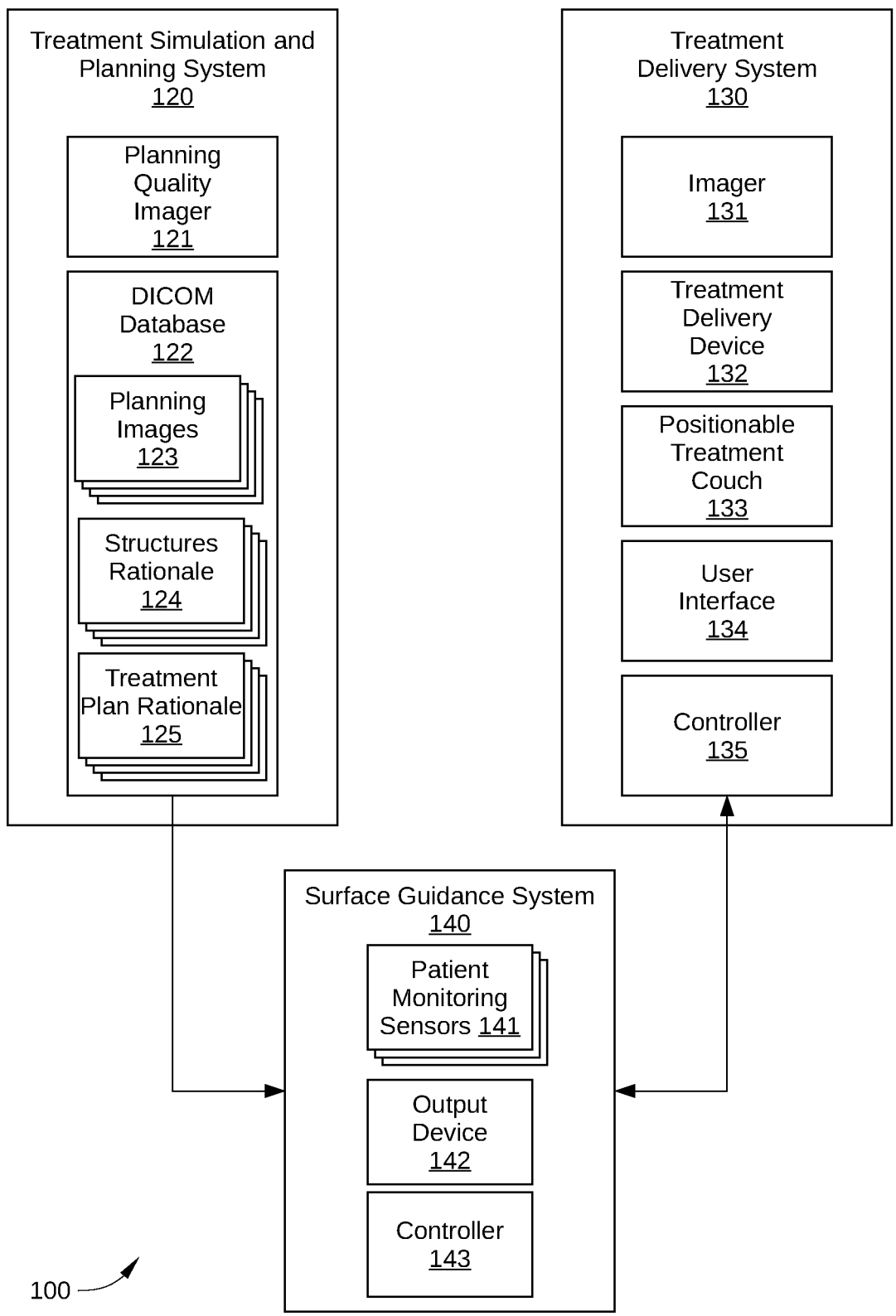
FIG. 1 is a perspective view of a radiation therapy system that can beneficially implement various aspects of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the figures, can be arranged, substituted, combined, and designed in a wide variety of different configurations, all of which are explicitly contemplated and make part of this disclosure.

Introduction

Surface guided radiation therapy (SGRT) is a rapidly growing technology used to improve the accuracy of dose delivery in radiation treatment. In SGRT, optical monitoring of a patient's surface is employed during patient setup and treatment to precisely track patient motion and position in three-dimensions. Such optical monitoring provides feedback to the radiation therapist or other user indicating precisely how the current patient position differs from a planned patient position, which is the patient position required for accurate dosing during a particular treatment session or fraction. Therefore, the use of real-time optical monitoring of a patient surface facilitates patient and accessory setup, interfraction positioning, and intrafraction patient motion detection.

Generally, a surface guidance system that is capable of providing real-time patient surface monitoring is typically independent from the treatment delivery system actually providing the radiation therapy. As a result, SGRT can complicate the workflow of a radiation therapist by necessitating additional user inputs for coordinating the operations of the treatment delivery system and the surface guidance system. One example of such additional inputs is couch position information. In conventional systems, without specific inputs or other intervention by the radiation therapist, a surface guidance system will generally interpret changes in couch position to be motion by the patient. Consequently, couch motion can cause the surface guidance system to erroneously calculate offsets between the currently monitored patient surface and a planned patient position that is assumed to be located at a previous couch position. Thus, any procedure in the treatment delivery system that involves changing couch position requires intervention on the part of the radiation therapist to enable the surface guidance system to correctly calculate offsets between the currently monitored patient surface and the planned patient position. For example, when the couch of a treatment delivery system is moved from a patient setup position to a patient treatment position, the radiation therapist must notify the surface guidance system of this couch motion and, in some instances, manually provide couch shift coordinates.

Another example of additional user inputs required by conventional systems is an indication when the surface guidance system should acquire the reference surface of the patient used to detect patient motion during a treatment fraction. In conventional systems, prior to delivery of radiation, a user must manually indicate to the surface guidance system when to acquire a reference surface of the patient. These types of workflows in conventional systems increase the time required to treat a patient, and can be prone to human error.

In light of the above, there is a need in the art for improved techniques for performing radiation therapy in conjunction with patient surface monitoring.

According to various embodiments, synchronization of the operation of a treatment delivery system and a surface guidance system enables streamlined user workflows. In some embodiments, a treatment delivery system transmits position information to an associated surface guidance system when couch position is changed, such as when moving the couch from a patient setup position to a patient treatment position, when moving the couch from a first image acquisition position to a second image acquisition position, or when moving the couch from a first treatment isocenter position to a second treatment isocenter position. In such embodiments, the surface guidance system can automatically adjust the current position of a planned patient surface relative to the radiotherapy system. In other embodiments, a treatment delivery system indicates to an associated surface guidance system that delivery of radiation is beginning to a region of patient anatomy, such as a treatment beam or an X-ray imaging beam. In such embodiments, the surface guidance system is automatically triggered to acquire a reference surface of the patient for use during SGRT, thereby obviating the need for a user to manually acquire the reference surface. Various example embodiments are described below.

System Overview

FIG. 1 is a perspective view of a radiation therapy system 100 that can beneficially implement various embodiments. In the embodiment illustrated in FIG. 1, radiation therapy system 100 includes a treatment simulation and planning system 120, a treatment delivery system 130, and a surface guidance system 140. Radiation therapy system 100 is configured to perform radiotherapy in conjunction with optical monitoring of a patient surface, and therefore is capable of performing surface guided radiation therapy (SGRT) and/or provide real-time feedback for patient and accessory setup prior to delivery of a treatment fraction.

Treatment simulation and planning system 120 generates a treatment plan for a patient, for example in response to a diagnosis for a patient that indicates the patient is to be treated via external beam radiation therapy. The diagnosis typically indicates external beam radiation therapy based on various factors, including: the type of cancer tumor that has been detected, the size of the detected tumor, the location of the tumor in the body, proximity of the tumor to organs at risk (OARs) or other normal tissues that are sensitive to radiation, the general health and medical history of the patient, the presence of other types of cancer in the patient, the age of the patient, certain medical conditions of the patient, and the like.

In the embodiment shown in FIG. 1, treatment simulation and planning system 120 includes a planning quality imager 121 and a Digital Imaging and Communications in Medicine (DICOM®) database 122. Planning quality imager 121 can be any device or system capable of generating planning images 123 of sufficient quality for performing treatment planning. In some embodiments, planning quality imager 121 can be a computerized tomography (CT) scanner, a magnetic resonance imager (MRI), or the like. As shown, planning images 123 and/or planning structures derived from planning images 123 are stored on DICOM® database 122, and can be accessed by treatment delivery system 130 and surface guidance system 140. In some embodiments, each planning image 123 includes a digital volume of a region of patient anatomy and planning structures derived therefrom, such as a three-dimensional (3D) surface of the patient and/or patient anatomy, segmented structures, such as planning target volumes and OARs, and the like. In some embodiments, DICOM® database 122 also stores a structures rationale 124 and a treatment plan rationale 125 for one or more patients. Structures rationale 124 includes a DICOM® structure that represents a body outline of a patient, thereby enabling comparison during patient setup to a live surface of a patient from surface guidance system 140. Treatment plan rationale 125 provides, for example, treatment isocenter information for a patient.

Treatment delivery system 130 delivers a treatment fraction to a region of patient anatomy as indicated by a treatment plan for the patient. In the embodiment shown in FIG. 1, treatment delivery system 130 includes an imaging device 131, such as a kilo-Volt (kV) imaging system, and a treatment delivery device 132, such as a treatment beam-generating device. Treatment delivery system 130 further includes a positionable couch 133 for supporting and precisely positioning a patient relative to treatment delivery device 132, a user interface (UI) 134 for receiving inputs from and displaying pertinent information to a user, and a controller 135 for controlling operation of treatment delivery system 130. One embodiment of treatment delivery system 130 is described below in conjunction with FIGS. 2-5.

Figure 2:
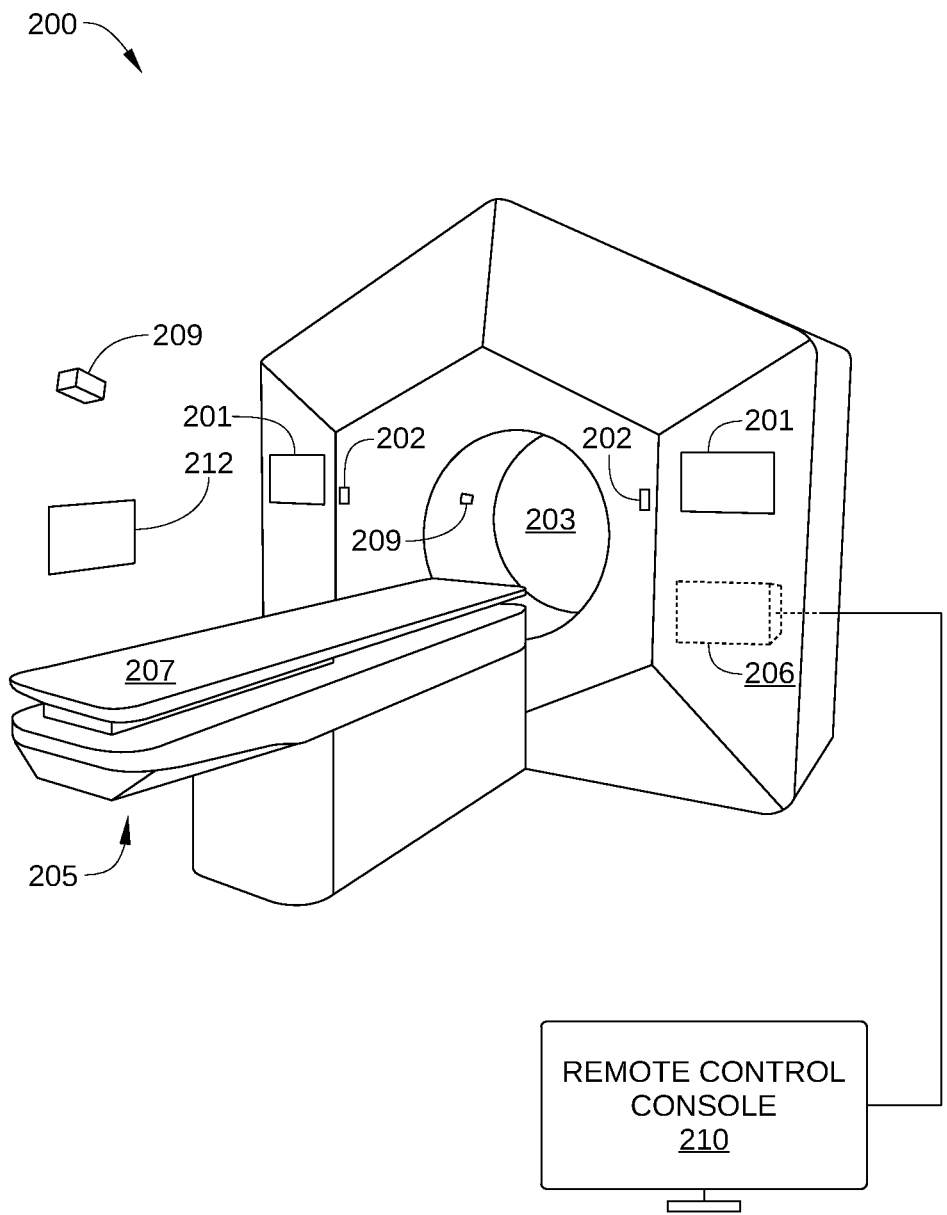
FIG. 2 is a perspective view of a treatment delivery system, according to various embodiments.

FIG. 2 is a perspective view of a treatment delivery system 200, according to various embodiments. In some embodiments, treatment delivery system 200 can be employed as treatment delivery system 130 in FIG. 1. In some embodiments, treatment delivery system 200 includes an imaging system configured to image patient anatomy using X-ray imaging techniques. For example, in some embodiments, treatment delivery system 200 is configured to provide stereotactic radiosurgery and precision radiotherapy for lesions, tumors, and conditions anywhere in the body where radiation treatment is indicated. As such, treatment delivery system 200 can include one or more of a linear accelerator (LINAC) that generates a megavolt (MV) treatment beam of high energy X-rays, one or more kilovolt (kV) X-ray sources, one or more X-ray imagers, and, in some embodiments, an MV electronic portal imaging device (EPID). By way of example, radiation therapy system 200 is described herein configured with a circular gantry. In other embodiments, radiation therapy system 200 can be configured with a C-gantry capable of infinite rotation via a slip ring connection. In yet other embodiments, radiation therapy system 200 can be configured with an imaging system having an MRI-based imaging capability.

In some embodiments, treatment delivery system 200 is capable of kV imaging of a target volume immediately prior to or during application of an MV treatment beam, so that an IGRT and/or an intensity-modulated radiation therapy (IMRT) process can be performed using X-ray imaging. Treatment delivery system 200 may include one or more touchscreens 201, couch motion controls 202, a bore 203, a base positioning assembly 205, a couch 207 disposed on base positioning assembly 205, and an image acquisition and treatment control computer 206, all of which are disposed within a treatment room. Treatment delivery system 200 further includes a remote control console 210, which is disposed outside the treatment room and enables treatment delivery and patient monitoring from a remote location. Base positioning assembly 205 is configured to precisely position couch 207 with respect to bore 203, and motion controls 202 include input devices, such as button and/or switches, that enable a user to operate base positioning assembly 205 to automatically and precisely position couch 207 to a predetermined location with respect to bore 203. Motion controls 202 also enable a user to manually position couch 207 to a predetermined location.

In some embodiments, treatment delivery system 200 is associated with or includes one or more patient-monitoring sensors 209. Patient-monitoring sensors 209 can be incorporated into a patient position-monitoring system or surface guidance system (such as surface guidance system 140 in FIG. 1) that can generate a surface map of the surface of a patient positioned on couch 207. In operation, the surface map and/or indicators showing offsets between a current patient position and a planned patient position are displayed on an output device 212, such as a display screen located proximate couch 207. In some embodiments, patient-monitoring sensors 209 can include stereo vision cameras, time-of-flight sensors, surface scanners, and/or the like for computing a live 3D mesh of a surface of a patient positioned on couch 207. Thus, the patient position-monitoring system or surface image guidance system that includes patient-monitoring sensors 209 can be used for the setup of a patient and/or patient positioning accessories, interfraction positioning, and intrafraction patient motion detection. For example, in some instances, when the position of a patient on couch 207 exceeds a predefined offset threshold during treatment, a treatment beam can be automatically turned off. In some embodiments, the patient position-monitoring or surface guidance system that includes patient-monitoring sensors 209 is incorporated in treatment delivery system 200. In other embodiments, the patient position-monitoring or surface image guidance system can be a system external to but communicatively coupled to treatment delivery system 200, such as surface guidance system 140. In the embodiment illustrated in FIG. 2, treatment delivery system 200 is associated with a single patient-monitoring sensor 209, while in other embodiments, treatment delivery system 200 can be associated with multiple patient-monitoring sensors 209.

Figure 3:
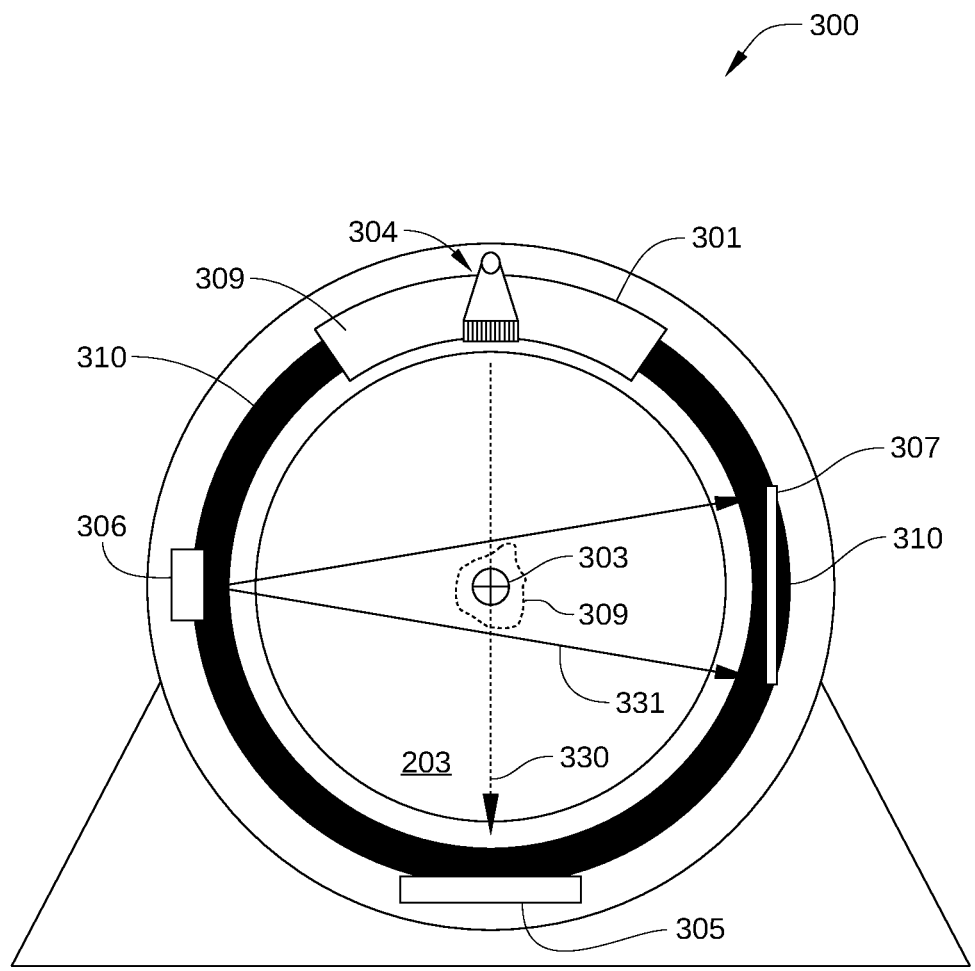
FIG. 3 schematically illustrates a drive stand and gantry of the treatment delivery system of FIG. 2, according to various embodiments.

FIG. 3 schematically illustrates a drive stand 300 and gantry 310 of treatment delivery system 200, according to various embodiments. Covers, base positioning assembly 205, couch 207, and other components of treatment delivery system 200 are omitted in FIG. 3 for clarity. Drive stand 300 is a fixed support structure for components of treatment delivery system 200, including gantry 310 and a drive system 301 for rotatably moving gantry 310. Drive stand 300 rests on and/or is fixed to a support surface that is external to treatment delivery system 200, such as a floor of a radiotherapy treatment facility. Gantry 310 is rotationally coupled to drive stand 300 and is a support structure on which various components of treatment delivery system 200 are mounted, including a linear accelerator (LINAC) 304, an MV electronic portal imaging device (EPID) 305, an imaging X-ray source 306, and an X-ray imager 307. During operation of treatment delivery system 200, gantry 320 rotates about bore 203 when actuated by drive system 301.

Drive system 301 rotationally actuates gantry 310. In some embodiments, drive system 301 includes a linear motor that can be fixed to drive stand 300 and interacts with a magnetic track (not shown) mounted on gantry 310. In other embodiments, drive system 301 includes another suitable drive mechanism for precisely rotating gantry 310 about bore 301. LINAC 304 generates an MV treatment beam 330 of high energy X-rays (or in some embodiments electrons, protons, and/or other heavy charged particles, ultra-high dose rate X-rays (e.g., for FLASH radiotherapy) or microbeams for microbeam radiation therapy) and EPID 305 is configured to acquire X-ray images with treatment beam 330. Imaging X-ray source 306 is configured to direct a conical beam of X-rays, referred to herein as imaging X-rays 331, through an isocenter 303 of treatment delivery system 200 to X-ray imager 307, and isocenter 303 typically corresponds to the location of a target volume 309 to be treated. In the embodiment illustrated in FIG. 3, X-ray imager 307 is depicted as a planar device, whereas in other embodiments, X-ray imager 307 can have a curved configuration. Imaging X-ray source 306 and X-ray imager 307 can be employed as imaging device 131 in FIG. 1.

X-ray imager 307 receives imaging X-rays 331 and generates suitable projection images therefrom. According to certain embodiments, such projection images can then be employed to construct or update portions of imaging data for a digital volume that corresponds to a three-dimensional (3D) region that includes target volume 309. That is, a 3D image of such a 3D region is reconstructed from the projection images. In some embodiments, the 3D image is reconstructed from projection images that are acquired with couch 207 in FIG. 2 located at different imaging positions. For example, in some embodiments, a first set of one or more projection images are acquired with couch 207 located at a first position, a second set of one or more projection images is acquired with couch 207 located at a second position, a third set of one or more projection images is acquired with couch 207 located at a third position, and so on. In some embodiments, CBCT and/or digital tomosynthesis (DTS) can be used to process the projection images generated by X-ray imager 307. CBCT is often employed at the beginning of a radiation therapy session to generate a set-up 3D reconstruction. For example, CBCT may be employed immediately prior to application of treatment beam 330 to generate a 3D reconstruction confirming that target volume 309 has not moved or changed shape.

In the embodiment illustrated in FIG. 3, treatment delivery system 200 includes a single X-ray imager and a single corresponding imaging X-ray source. In other embodiments, treatment delivery system 200 can include two or more X-ray imagers, each with a corresponding imaging X-ray source. One such embodiment is illustrated in FIG. 4.

Figure 4:
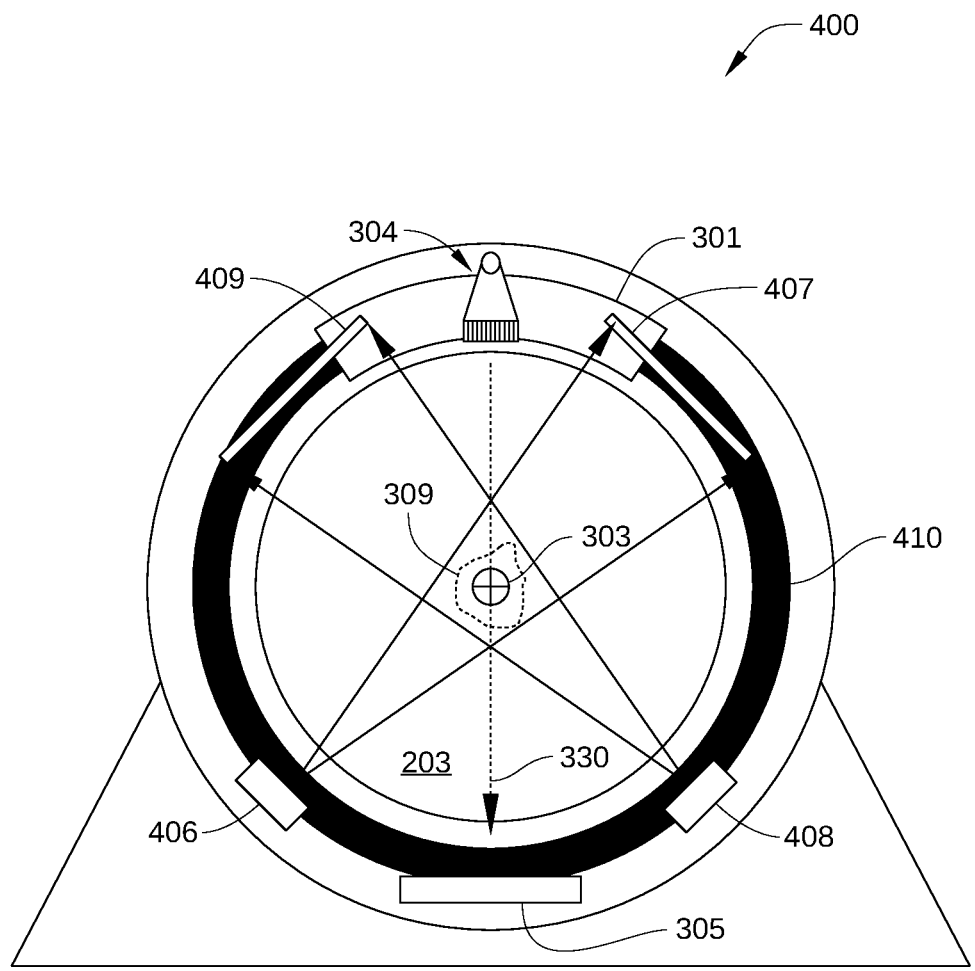
FIG. 4 schematically illustrates a drive stand and a gantry of the treatment delivery system of FIG. 2, according to various embodiments.

FIG. 4 schematically illustrates a drive stand 400 and gantry 410 of treatment delivery system 200, according to various embodiments. Drive stand 400 and gantry 410 are substantially similar in configuration to drive stand 300 and gantry 300 in FIG. 3, except that the components of treatment delivery system 200 that are mounted on gantry 410 include a first imaging X-ray source 406, a first X-ray imager 407, a second imaging X-ray source 408, and a second X-ray imager 409. In such embodiments, the inclusion of multiple X-ray imagers in treatment delivery system 200 facilitates the generation of projection images (for reconstructing the target volume) over a shorter image acquisition arc. For instance, in some instances, when treatment delivery system 200 includes two X-ray imagers and corresponding X-ray sources, sufficient information can be collected to reconstruct a 3D region that includes target volume 409 without rotating gantry 410. Alternatively, in some instances, when treatment delivery system 200 includes two X-ray imagers and corresponding X-ray sources, an image acquisition arc for acquiring projection images of a certain image quality can be approximately half that for acquiring projection images of a similar image quality with a single X-ray imager and X-ray source.

The projection images generated by X-ray imager 307 in FIG. 3 (or by first x-ray imager 407 and second X-ray imager 409 in FIG. 4) are used prior to and/or during treatment to reconstruct a 3D digital volume of an object or portion of patient anatomy, such as a 3D region of patient anatomy that includes target volume 309. In some instances, such X-ray projection images, or a reconstructed 3D digital volume, are employed for initial patient positioning on couch 207. Such a reconstructed 3D digital volume includes a plurality of voxels of anatomical image data, where each voxel corresponds to a different location within the digital volume. Generally, the digital volume corresponds to a 3D region that includes a target volume.

For purposes of discussion, the target volume can refer to the gross tumor volume (GTV), clinical target volume (CTV), or the planning target volume (PTV) for a particular treatment. The GTV depicts the position and extent of the gross tumor, for example what can be seen or imaged; the CTV includes the GTV and an additional margin for sub-clinical disease spread, which is generally not imageable; and the PTV is a geometric concept designed to ensure that a suitable radiotherapy dose is actually delivered to the CTV without adversely affecting nearby organs at risk. Thus, the PTV is generally larger than the CTV, but in some situations can also be reduced in some portions to provide a safety margin around an organ at risk. The PTV is typically determined based on imaging performed prior to the time of treatment, and alignment of the PTV with the current position of patient anatomy at the time of treatment is facilitated by X-ray imaging of a digital volume.

Returning to FIG. 1, surface guidance system 140 provides real-time optical monitoring of a patient surface that facilitates patient setup and interfraction positioning. Additionally or alternatively, in some embodiments, surface guidance system 140 provides real-time optical monitoring of a patient surface that facilitates detection of intrafraction patient motion. Surface guidance system 140 includes one or more patient-monitoring sensors 141. An embodiment of a patient-monitoring sensor 141 is described below in conjunction with FIG. 5.

Figure 5:
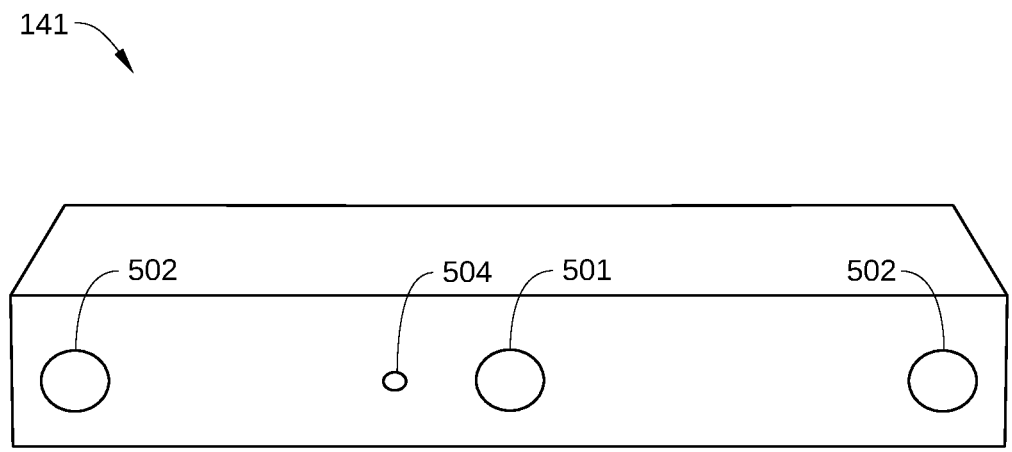
FIG. 5 schematically illustrates a patient-monitoring sensor of the surface guidance system of FIG. 1, according to various embodiments.

FIG. 5 schematically illustrates a patient-monitoring sensor 141 of the radiation therapy system of FIG. 1, according to various embodiments. In the embodiment illustrated in FIG. 5, patient-monitoring sensor 141 includes a projector 501, two image sensors 502 or cameras, and a calibration light-emitting diode (LED) 503. In operation, projector 501 projects a pseudo-random speckle pattern onto the surface of a patient, for example disposed on positionable treatment couch 133. The random speckle pattern provides texture variations employed in the surface reconstruction process. Image sensors 502 then acquire the raw textured data used for the 3D surface reconstruction. A controller of a surface guidance system, such as controller 143 in FIG. 1, then performs a 3D surface reconstruction process. In the 3D surface reconstruction process, projected and captured patterns are compared to identify the coordinates of each pixel in the captured image.

Returning to FIG. 1, surface guidance system 140 further includes an output device 142 and a controller 143. Output device 142 can display the results of real-time optical monitoring of a surface of a patient disposed on positionable treatment couch 133, such as a wall-mounted display screen located proximate couch 207. In some embodiments, output device 142 can be consistent with output device 212 in FIG. 2. Controller 143 controls operation of surface guidance system 140 as described herein and retrieves planning images and other patient-related information from DICOM® database 122. Controller 143 also receives information from treatment delivery system 130, such as a 3D day-of-treatment image of a region of patient anatomy, a patient surface or patient outline based on such a 3D day-of-treatment image, and/or certain control signals. According to various embodiments, such control signals can include an indication that delivery of a radiation dose is beginning to a region of patient anatomy and/or position information for positionable treatment couch 133. In addition, controller 143 transmits various signals to treatment delivery system 130, such as an interrupt signal for indicating that a treatment beam should be turned off due to patient motion detected by surface guidance system 140 during treatment. In some embodiments, controller 143 receives information from and/or transmits information to treatment delivery system 130 via a device interface, such as an application programming interface (API).

In some embodiments, controller 143 performs a 3D surface reconstruction process based on images acquired by one or more patient-monitoring sensors 141 to generate a current patient surface. In some embodiments, the current patient surface so generated is a live surface of the patient, which can be acquired in real time using conventional surface-monitoring techniques known in the art. In such embodiments, controller 143 can register the current patient surface to a reference patient surface to generate a deviation of the current patient surface from the reference surface. Example embodiments of a current patient surface and a reference patient surface are described below in conjunction with FIG. 6.

Figure 6:
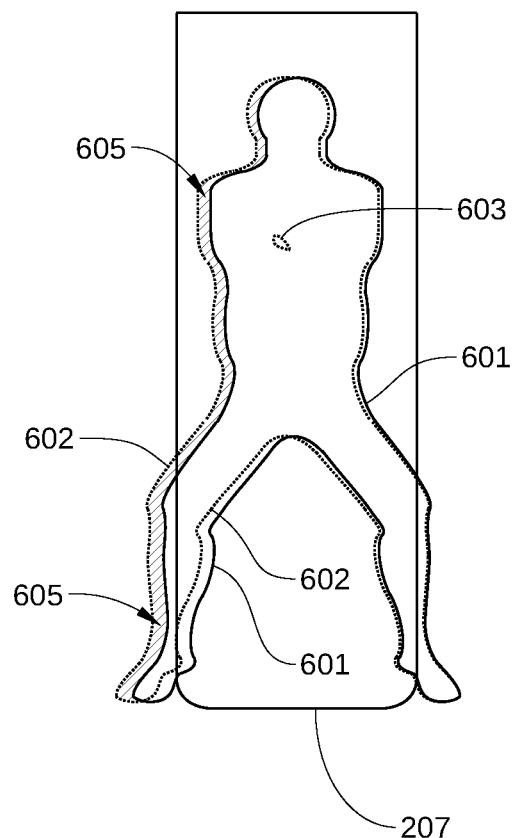
FIG. 6 schematically illustrates a current patient surface juxtaposed with a reference patient surface, according to various embodiments.

FIG. 6 schematically illustrates a current patient surface 601 (solid line) juxtaposed with a reference patient surface 602 (dotted line), according to various embodiments. Current patient surface 601 can be generated by surface guidance system 140, for example based on images or other image information acquired by surface guidance system 140, while a patient is disposed on couch 207. In the embodiment illustrated in FIG. 6, current patient surface 601 also indicates the position in three-dimensional space of the surface of a patient relative to couch 207. Current patient surface 601 depicts this surface as a plurality of pixels that can be displayed, for example, by output device 212 in FIG. 2. For reference, FIG. 6 also shows a target volume 603 disposed within current patient surface 601, although in practice target volume 603 is not directly detectable by surface guidance system 140 and is not generally displayed with current patient surface 601. Reference surface 602 indicates a target position and location for the surface of the patient when disposed on couch 207 and undergoing treatment. In the embodiment illustrated in FIG. 2, current patient surface 601 and reference surface 602 are depicted as two-dimensional outlines, but in practice are typically implemented as 3D surfaces.

In operation, after controller 143 (shown in FIG. 1) performs a 3D surface reconstruction process, controller 143 registers current patient surface 601 to reference patient surface 602 in order to generate deviations 605 (cross-hatched area) of current patient surface 601 from reference surface 602. For example, in some embodiments, the deviation of current patient surface 601 from reference patient surface 602 can include six degree-of-freedom shift information or other real-time delta information. Controller 143 can display or otherwise provide this shift information or other real-time delta information to the user, for example via output device 142. In some embodiments, controller 143 can update deviations 605 in real-time, for example at a frame rate on the order of 10s of frames per second. In some embodiments, reference patient surface 602 is based on a planned patient surface. In such embodiments, reference patient surface 602 corresponds to a planned patient surface, such as a surface of the patient at the time that a treatment planning image of the patient is acquired. Alternatively or additionally, in some embodiments, reference patient surface 602 is based on a patient surface that is acquired when a treatment beam or imaging beam begins being directed to a region of patient anatomy, or immediately prior to the treatment beam or imaging beam being directed to the region of patient anatomy. In such embodiments, controller 143 employs reference patient surface 602 to detect intra-fraction motion of the patient.

Synchronization of Treatment Delivery System and Surface Guidance System During Patient Setup According to various embodiments, the operations of treatment delivery system 130 and surface guidance system 140 are synchronized during patient setup to simplify the user workflow of a radiation therapist. More specifically, during patient setup, treatment delivery system 130 transmits position information for repositionable treatment couch 133 to surface guidance system 140. The position information can then be employed by surface guidance system 140 to modify a virtual location of a reference patient surface when calculating deviations. One such embodiment is described below in conjunction with FIGS. 7A and 7B.

Figure 7A:
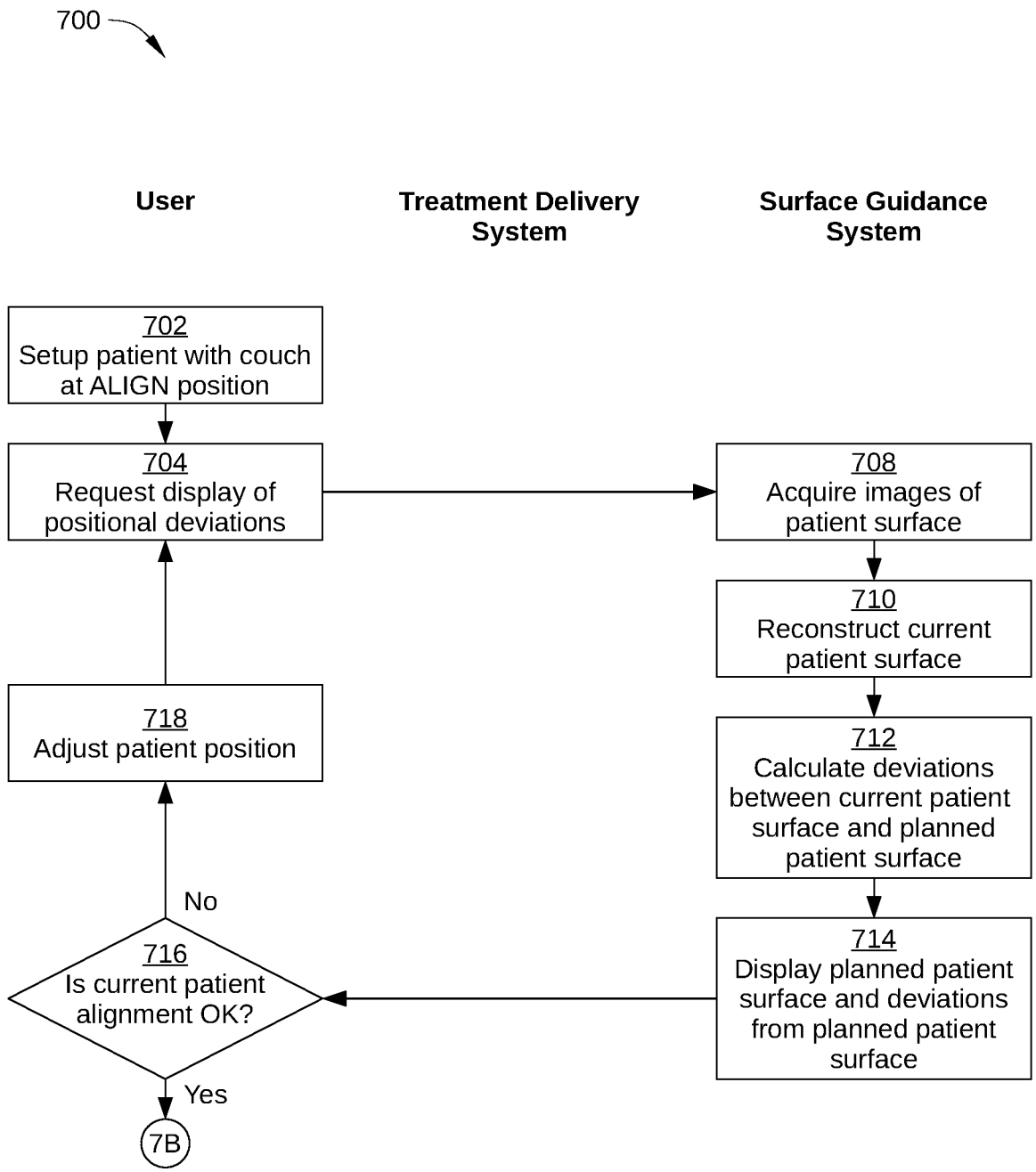
FIGS. 7A and 7B set forth a flowchart of a method for a radiotherapy system, according to one or more embodiments.
Figure 7B:
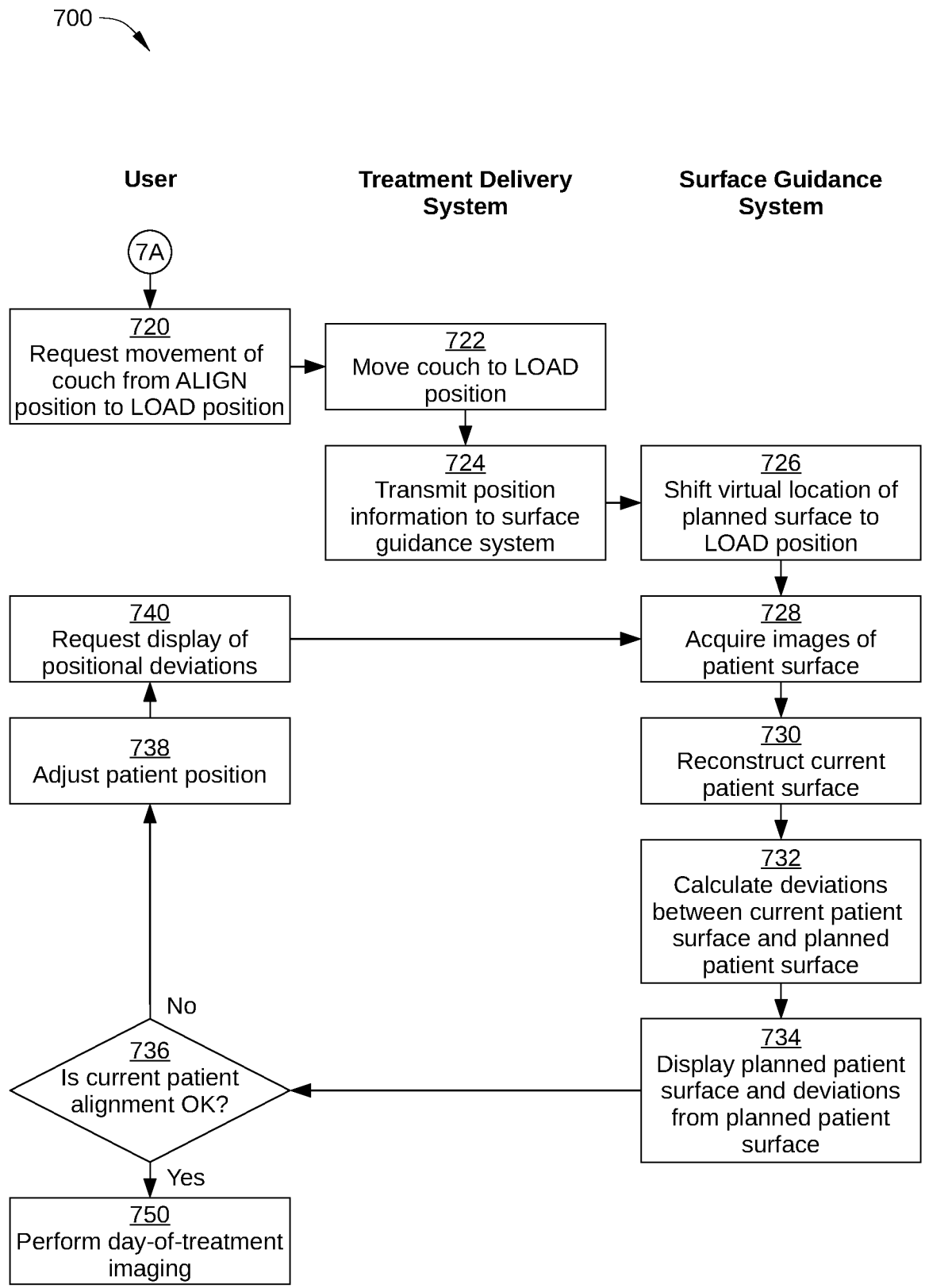

FIGS. 7A and 7B set forth a flowchart of a method 700 for a radiotherapy system, according to one or more embodiments. In some embodiments, method 700 can be performed as part of a specific radiotherapy session or radiotherapy treatment fraction. Generally, radiotherapy treatment fractions are employed to reduce toxic effects on healthy cells, by dividing a total dose of radiation for a patient into multiple smaller doses (fractions). Typically, each treatment fraction is delivered over a period of several or many days, for example every day for several weeks.

Method 700 may include one or more operations, functions, or actions as illustrated by one or more of blocks 702-750. Although the blocks are illustrated in a sequential order, these blocks may be performed in parallel, and/or in a different order than those described herein. Also, the various blocks may be combined into fewer blocks, divided into additional blocks, and/or eliminated based upon the desired implementation. Although method 700 is described in conjunction with treatment delivery system 200 and FIGS. 1-6, persons skilled in the art will understand that performance of method 700 by any suitably configured radiotherapy system is within the scope of the present embodiments.

In step 702, a user, such as a radiation therapist, sets up a patient while couch 207 is at an ALIGN position, or other patient setup position where the patient and accessories are positioned for a treatment fraction. In the ALIGN position, couch 207 is typically disposed outside of bore 203 of treatment delivery system 200, so that the radiation therapist can readily access the patient. In some embodiments, setting up the patient can also involve placement of one or more mobility accessories. Generally, the user sets up the patient in a pose that as closely as possible matches the pose of the patient associated with the acquisition of the treatment planning image.

In step 704, the user requests display of positional deviations between the current patient surface and the planned patient surface. For example, in some embodiments, the user enters an input via a touchscreen associated with surface guidance system 140 to initiate the request for real-time surface monitoring by surface guidance system 140. Alternatively, in some embodiments, surface guidance system 140 initiates real-time surface monitoring in response to detecting the presence of a patient on couch 207.

In step 708, in response to receiving the request from the user, surface guidance system 140 acquires images or other image information of the patient surface via one or more patient-monitoring sensors 209. In step 710, surface guidance system 140 reconstructs a current patient surface based on the acquired images or other image information. In step 712, surface guidance system 140 calculates positional deviations between the current patient surface and the planned patient surface. For example, in some embodiments, controller 143 registers the current patient surface to the reference patient surface, where the reference patient surface is virtually located at the ALIGN position. In step 714, surface guidance system 140 displays deviations of the current patient surface from the reference patient surface, for example via output device 212.

In step 716, the user determines whether the current patient positioning (e.g., pose and alignment) is within allowable deviation thresholds. In some embodiments, the user makes such a determination based on the deviations being displayed in real-time by surface guidance system 140. If yes, method 700 proceeds to step 720; if no, method 700 proceeds to step 718. In step 718, the user adjusts the position, alignment, and/or pose of the patient. For example, in step 718 the user can view output device 212 while adjusting the position, alignment, and/or pose of the patient.

Step 720 is performed in response to the user determining that the current patient positioning is within allowable deviation thresholds in step 716. In step 720, the user requests movement of couch 207 from an ALIGN position (e.g., a patient setup position) to a LOAD position (e.g., a patient treatment position). At the patient setup position, in which couch 207 is disposed outside bore 203, the radiation therapist can access and position the patient and accessories for the current treatment fraction. By contrast, at the patient treatment position, couch 207 is disposed at least partially within bore 203, so that the patient is positioned appropriately relative to treatment delivery system 200 for delivery of the current treatment fraction. For example, in some embodiments, at the patient treatment position, a target volume within a region of patient anatomy is positioned to be coincident with isocenter 303.

In step 722, treatment delivery system 200 moves couch 207 to the LOAD (or patient treatment) position. In step 724, treatment delivery system 200 transmits position information to surface guidance system 140, for example via a suitable API. In some embodiments, the position information includes an indication that the couch is disposed in a patient treatment position. Alternatively or additionally, in some embodiments, the position information includes couch shift coordinates that indicate a displacement of the couch from the patient setup position to the patient treatment position. In some embodiments, the couch shift coordinates include relative couch shift values, and in other embodiments, the couch shift coordinates include absolute couch position values. Thus, in such embodiments, the position information enables surface guidance system 140 to adjust a current virtual position of the reference patient surface relative to treatment delivery system 200.

In step 726, surface guidance system 140 shifts the virtual location of the reference patient surface from the ALIGN (or patient setup) position to the LOAD (or patient treatment) position. In some embodiments, in response to receipt of the position information, surface guidance system 140 shifts the virtual location of the reference patient surface based on couch shift coordinate values included in the position information received in step 724. In other embodiments, surface guidance system 140 shifts the virtual location of the reference patient surface using previously determined couch shift coordinate values for motion of couch 207 between the ALIGN and LOAD positions. In either case, surface guidance system 140 can shift the virtual location of the reference patient surface relative to treatment delivery system 200 in multiple directions and/or with respect to various degrees of freedom. Thus, based on the position information, surface guidance system 140 can shift the virtual location of the reference patient surface vertically, horizontally, and/or longitudinally as appropriate. Alternatively or additionally, based on the position information, surface guidance system 140 can rotate the virtual position of the reference patient surface about one or more axes (e.g., a vertical axis, a horizontal axis, and/or a longitudinal axis) as appropriate.

In step 728, surface guidance system 140 acquires image information of the current patient surface. For example, in some embodiments, surface guidance system 140 acquires one or more images from each patient-monitoring sensor 209 included in surface guidance system 140. In step 730, surface guidance system 140 reconstructs a current patient surface based on the acquired images or other image information. In step 732, surface guidance system 140 calculates positional deviations (e.g., rotational and translational offsets) between the current patient surface and the reference patient surface. For example, in some embodiments, controller 143 registers the current patient surface reconstructed in step 730 to the reference patient surface, where the reference patient surface is virtually located at the LOAD position. In step 734, surface guidance system 140 displays deviations of the current patient surface from the reference patient surface, for example via output device 212. In some embodiments, rotational and translational offsets are displayed in virtual reality as a color gradient overlaid onto a live video feed of the patient, indicating posture changes needed to bring the patient into proper alignment. In other embodiments, any other technically feasible visual indication scheme can be employed by surface guidance system 140 to indicate deviations of the current patient surface from the reference patient surface.

In step 736, the user determines whether the current patient positioning is within allowable deviation thresholds. In some embodiments, the user makes such a determination based on the deviations being displayed in real-time by surface guidance system 140. If yes, method 700 proceeds to step 750; if no, method 700 proceeds to step 738. In step 738, the user adjusts the position, alignment, and/or pose of the patient. For example, in step 738 the user can view output device 212 while adjusting the position, alignment, and/or pose of the patient.

In step 740, the user requests display of positional deviations between the current patient surface and the planned patient surface, for example via an input to surface guidance system 140. Alternatively, in some embodiments, surface guidance system 140 initiates or continues real-time surface monitoring in response to detecting the presence of a patient on couch 207. In response, surface guidance system 140 performs another iteration of steps 726-734 as shown.

Step 750 is performed in response to the user determining that the current patient positioning is within allowable deviation thresholds in step 736. In step 750, the user proceeds with a radiotherapy workflow, for example for performing day-of-treatment imaging of a region of patient anatomy.

Synchronization of Treatment Delivery System and Surface Guidance System During Patient Setup According to various embodiments, the operations of treatment delivery system 130 and surface guidance system 140 are synchronized during day-of-treatment imaging to simplify the user workflow of a radiation therapist. More specifically, after patient setup and prior to delivery of treatment, treatment delivery system 130 transmits position information for repositionable treatment couch 133 to surface guidance system 140. The position information indicates the current imaging position of couch 207, and can be employed by surface guidance system 140 to modify a virtual location of a reference patient surface. One such embodiment is described below in conjunction with FIG. 8.

Figure 8:
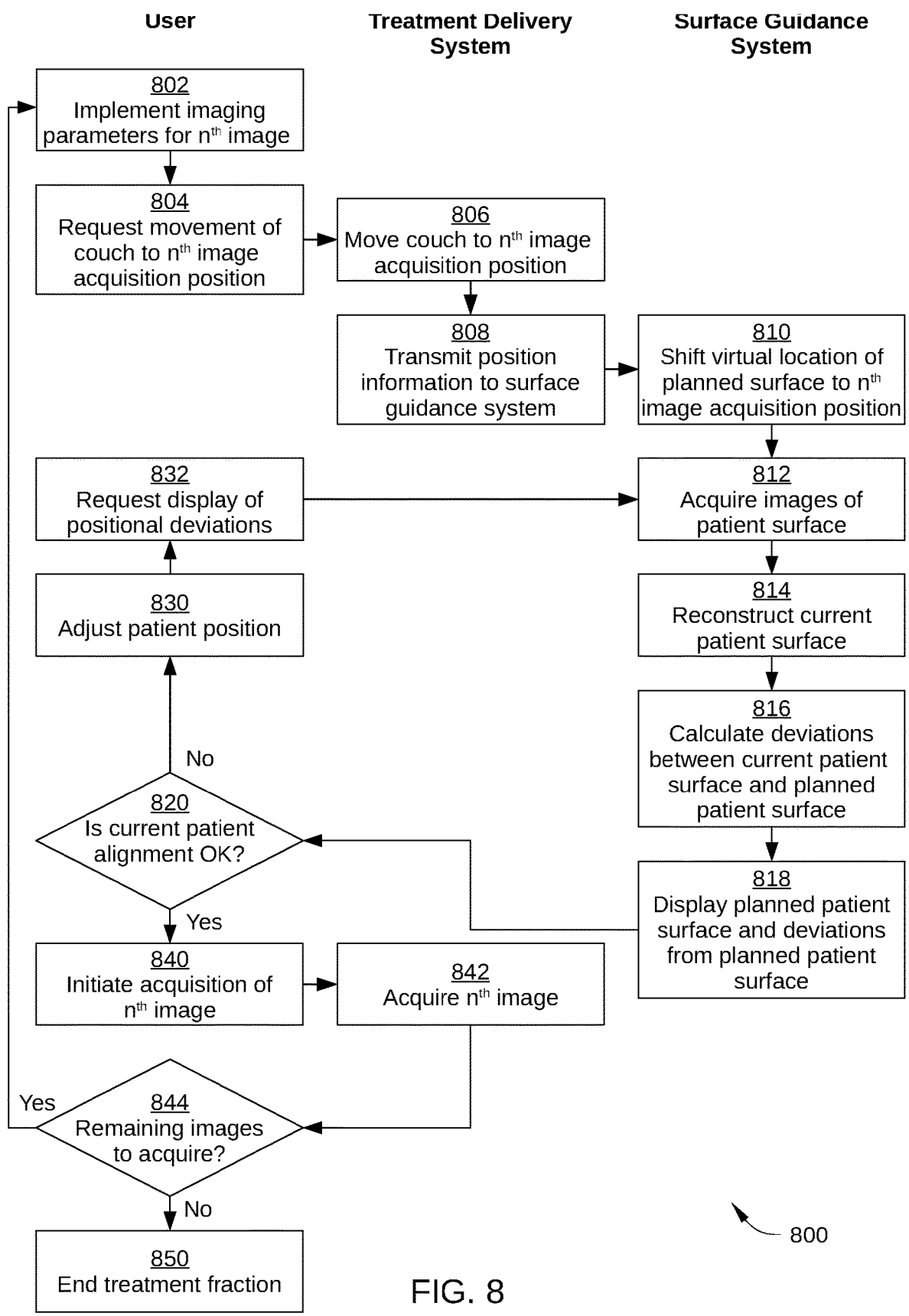
FIG. 8 sets forth a flowchart of a method for a radiotherapy system, according to one or more embodiments.

FIG. 8 sets forth a flowchart of a method 800 for a radiotherapy system, according to one or more embodiments. In some embodiments, method 800 can be performed as part of a specific radiotherapy session or radiotherapy treatment fraction. Method 800 may include one or more operations, functions, or actions as illustrated by one or more of blocks 802-850. Although the blocks are illustrated in a sequential order, these blocks may be performed in parallel, and/or in a different order than those described herein. Also, the various blocks may be combined into fewer blocks, divided into additional blocks, and/or eliminated based upon the desired implementation. Although method 800 is described in conjunction with treatment delivery system 200 and FIGS. 1-6, persons skilled in the art will understand that performance of method 800 by any suitably configured radiotherapy system is within the scope of the present embodiments.

In some embodiments, prior to method 800, a user, such as a radiation therapist, sets up a patient while couch 207 is at the ALIGN position, confirms that the current patient positioning (e.g., pose and alignment) is within allowable deviation thresholds, and requests movement of couch 207 from the ALIGN position to the LOAD position. Treatment delivery system 200 moves couch 207 to the LOAD position, surface guidance system 140 displays deviations of the current patient surface from the reference patient surface, and the user confirms that the current patient positioning is still within allowable deviation thresholds, so that X-ray imaging of the patient can be performed.

In step 802, the user implements imaging parameters of treatment delivery system 200 for X-ray image acquisition of a region of patient anatomy. For example, the user may input pertinent X-ray imaging parameter values (such as beam energy, couch position values, and the like) so that treatment delivery system 200 can generate a day-of-treatment 3D volumetric data set (or digital volume) of the region of patient anatomy. In some embodiments, to generate the single 3D volumetric data set for the region, a different set of one or more images may be acquired for each of multiple different positions of couch 207. For example, in such embodiments, multiple CBCT acquisitions may be performed, each with couch 207 located at a different imaging position relative to treatment delivery system 200. In such embodiments, N different CBCT acquisitions are performed with couch 207 located at N different imaging positions. Thus, in such embodiments, in step 802 the user inputs the pertinent X-ray imaging parameter values for the nth CBCT acquisition.

In step 804, the user requests movement of couch 207 to the couch position for the nth X-ray acquisition, for example via one or more user inputs to treatment delivery system 200. In step 806, treatment delivery system 200 moves couch 207 to the couch position for the nth X-ray acquisition. In step 808, treatment delivery system 200 transmits position information to surface guidance system 140, for example via a suitable API. In some embodiments, the position information includes couch shift coordinates that indicate a displacement of the couch from the previous couch position to the current couch position. In some embodiments, the couch shift coordinates include relative couch shift values, and in other embodiments, the couch shift coordinates include absolute couch position values.

In step 810, surface guidance system 140 shifts the virtual location of the reference patient surface from the previous couch position (e.g., the couch position for the n−1$^{th}$ X-ray acquisition) to the current couch position (e.g., the couch position for the n$^{th}$ X-ray acquisition). Based on the position information received from treatment delivery system 200, surface guidance system 140 can shift the virtual location of the reference patient surface relative to treatment delivery system 200 vertically, horizontally, and/or longitudinally, and rotate the virtual position of the reference patient surface relative to treatment delivery system 200 about one or more axes as appropriate.

In step 812, surface guidance system 140 acquires images or other image information for the current patient surface, for example, from each patient-monitoring sensor 209 included in surface guidance system 140. In step 814, surface guidance system 140 reconstructs a current patient surface based on the acquired images or other image information. In step 816, surface guidance system 140 calculates positional deviations (e.g., rotational and translational offsets) between the current patient surface and the reference patient surface. In step 818, surface guidance system 140 displays deviations of the current patient surface from the reference patient surface, for example via output device 212.

In step 820, the user determines whether the current patient positioning is within allowable deviation thresholds. In some embodiments, the user makes such a determination based on the deviations being displayed in real-time by surface guidance system 140. If yes, method 800 proceeds to step 840; if no, method 800 proceeds to step 830. In step 830, the user adjusts the position, alignment, and/or pose of the patient. For example, in step 830 the user can view output device 212 while adjusting the position, alignment, and/or pose of the patient.

In step 830, the user requests display of positional deviations between the current patient surface and the planned patient surface, for example via an input to surface guidance system 140. Alternatively, in some embodiments, surface guidance system 140 initiates or continues real-time surface monitoring in response to detecting the presence of a patient on couch 207. In response, surface guidance system 140 performs another iteration of steps 812-818 as shown.

Step 840 is performed in response to the user determining that the current patient positioning is within allowable deviation thresholds in step 736. In step 840, the user initiates acquisition of the n$^{th}$ image, for example via one or more user inputs to treatment delivery system 200. In step 842, treatment delivery system 200 acquires the n$^{th}$ image in response to the user input(s).

In step 844, the user determines whether there are any remaining images to acquire. If yes, method 800 returns to step 802; if no, method 800 proceeds to step 850 and terminates. In step 850, the user performs delivery of a treatment fraction. In some embodiments, the user performs delivery of the treatment fraction based at least in part on the N images acquired in method 800.

Synchronization of Treatment Delivery System and Surface Guidance System at Treatment Delivery According to various embodiments, the operations of treatment delivery system 130 and surface guidance system 140 are synchronized at the time of treatment to simplify the user workflow of a radiation therapist. More specifically, after day-of-treatment imaging, treatment delivery system 130 transmits a signal to surface guidance system 140 indicating that delivery of a radiation dose is beginning to a region of patient anatomy. In response, surface guidance system 140 acquires a reference patient surface that can be employed throughout the treatment fraction to detect excessive patient motion. One such embodiment is described below in conjunction with FIG. 9.

Figure 9:
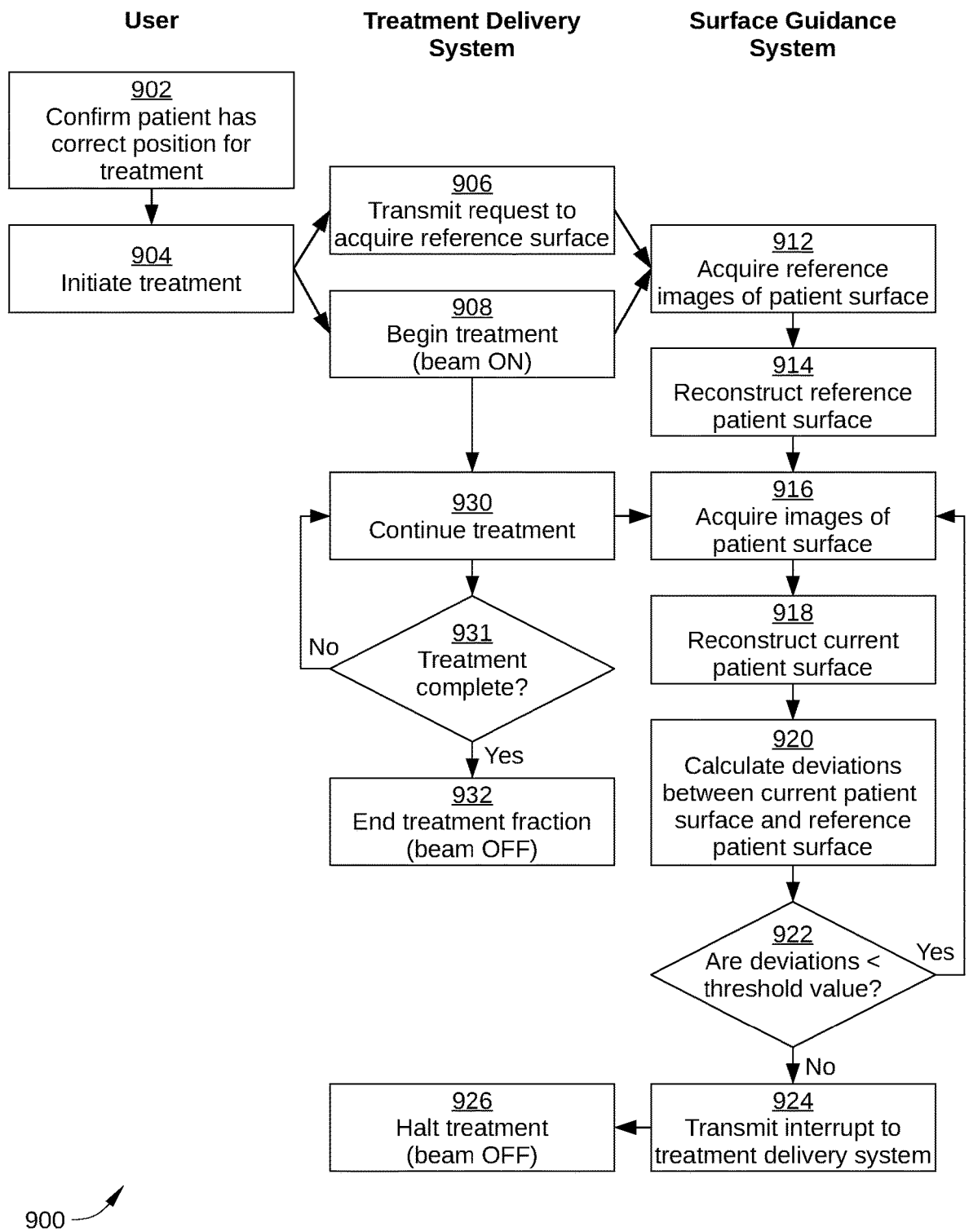
FIG. 9 sets forth a flowchart of a method for a radiotherapy system, according to one or more embodiments.

FIG. 9 sets forth a flowchart of a method 900 for a radiotherapy system, according to one or more embodiments. In some embodiments, method 900 can be performed as part of a specific radiotherapy session or radiotherapy treatment fraction. Method 900 may include one or more operations, functions, or actions as illustrated by one or more of blocks 902-932. Although the blocks are illustrated in a sequential order, these blocks may be performed in parallel, and/or in a different order than those described herein. Also, the various blocks may be combined into fewer blocks, divided into additional blocks, and/or eliminated based upon the desired implementation. Although method 900 is described in conjunction with treatment delivery system 200 and FIGS. 1-6, persons skilled in the art will understand that performance of method 900 by any suitably configured radiotherapy system is within the scope of the present embodiments.

In some embodiments, prior to method 900, a patient is prepared for radiation therapy, for example by being setup on couch 207 by a user, such as a radiation therapist. Day-of-treatment imaging can be employed to determine interfraction changes in patient anatomy. Such interfraction changes can be compensated for by repositioning couch 207 from the LOAD position so that a target volume is disposed at isocenter 303. Thus, in such embodiments, prior to method 900, couch 207 is moved from a first position (the LOAD position) that causes a planned patient anatomy to be positioned at isocenter 303 to a second position that causes a day-of-treatment patient anatomy to be positioned at isocenter 303. In such embodiments, treatment delivery system 200 can automatically provide position information for couch 207 to surface guidance system 140 so that surface guidance system 140 can shift the virtual location of a reference patient surface from the first position (LOAD) to the second position. In some embodiments, the position information includes couch shift coordinates that are based on a patient offset from a planned treatment location. In such embodiments, the patient offset from the planned treatment location can be determined by treatment delivery system 200 based on day-of-treatment imaging, for example as described above in conjunction with FIG. 8.

In step 902, the user confirms that the current patient position (e.g., pose and alignment) is still within allowable deviation thresholds. For example, in some embodiments, the user confirms that the current patient position is still within allowable deviation thresholds based on displayed deviations of the current patient surface from a reference patient surface.

In step 904, the user initiates treatment, for example via one or more user inputs to treatment delivery system 200. In step 906, in response to the one or more user inputs, treatment delivery system 200 transmits a request or other signal to surface guidance system 140 to acquire a reference surface, for example via a suitable API. In some embodiments, the request includes position information for couch 207. In step 908, also in response to the one or more user inputs, treatment delivery system 200 begins treatment, and turns on treatment beam 330. Additionally or alternatively, in some embodiments, as part of beginning treatment in step 908, treatment delivery system 200 turns on an imaging beam, such as imaging X-rays 331, for acquiring images of a portion of patient anatomy that includes target volume 309.

In step 912, in response to receiving the request from treatment delivery system 200, surface guidance system 140 acquires images or other image information of the patient surface via one or more patient-monitoring sensors 209. Alternatively, in some embodiments, surface guidance system 140 acquires images or other image information of the patient surface in response to treatment beam 330 being turned on in step 908. In step 914, surface guidance system 140 reconstructs a reference patient surface based on the images or other image information acquired in step 912. In some embodiments, the reference patient surface is then employed throughout the current treatment fraction for detecting excessive patient motion. Specifically, the reference patient surface is employed for a plurality of iterations of steps 916-922. In some embodiments, surface guidance system 140 can perform each iteration of steps 916-922 in a fraction of a second, for example on the order of 10 or 20 times per second.

In step 916, surface guidance system 140 acquires images or other image information of the patient surface via one or more patient-monitoring sensors 209. In step 918, surface guidance system 140 reconstructs a current patient surface based on the images or other image information acquired in step 916. In step 920, surface guidance system 140 calculates positional deviations between the current patient surface and the reference patient surface. In step 922, surface guidance system 140 determines whether the positional deviations determined in step 920 exceed allowable deviation thresholds. If yes, method 900 returns to step 916 and surface guidance system 140 continues to monitor the patient surface for motion; if no, method 900 proceeds to step 924. In step 924, surface guidance system 140 transmits an interrupt signal to treatment delivery system 200. Thus, surface guidance system 140 transmits the interrupt signal in response to a deviation of at least a portion of the current patient surface from the reference patient surface. In step 926, treatment delivery system 200 halts delivery of the treatment fractions and turns off treatment beam 330 and/or imaging X-rays 331.

In step 930, treatment delivery system 200 continues treatment. In some embodiments, continuation of treatment in step 930 includes delivery of treatment beam 330, for example continuously or in pulses. In addition, in some embodiments, continuation of treatment in step 930 includes delivery of one or more imaging beams, such as imaging X-rays 331. In step 932, treatment delivery system 200 determines whether the current treatment fraction has been completed. If yes, method 900 proceeds to step 932, where treatment delivery system 200 turns off treatment beam 330 and/or imaging X-rays 331 and the treatment fraction ends normally; if no, treatment delivery system 200 returns to step 930 and the treatment fraction continues.

According to various embodiments, the operations of treatment delivery system 130 and surface guidance system 140 are synchronized at multiple points in a radiotherapy treatment fraction to simplify the user workflow of a radiation therapist. More specifically, when a radiotherapy treatment fraction includes multiple treatment isocenters, the radiotherapy treatment fraction is divided into multiple segments, where couch 207 is positioned differently during each such segment so that a different target volume in the patient anatomy is positioned at isocenter 303. In the embodiments, treatment delivery system 130 transmits a signal to surface guidance system 140 each time couch 207 is repositioned for a different segment of the radiotherapy treatment fraction. In the embodiments, the signal indicates that couch 207 has been repositioned and includes position information that indicates the current imaging position of couch 207. Thus, the position information can be employed by surface guidance system 140 to modify a virtual location of a reference patient surface. In response to the signal, surface guidance system 140 acquires a new reference patient surface that can be employed throughout that segment of the treatment fraction to detect excessive patient motion. One such embodiment is described below in conjunction with FIG. 10.

Figure 10:
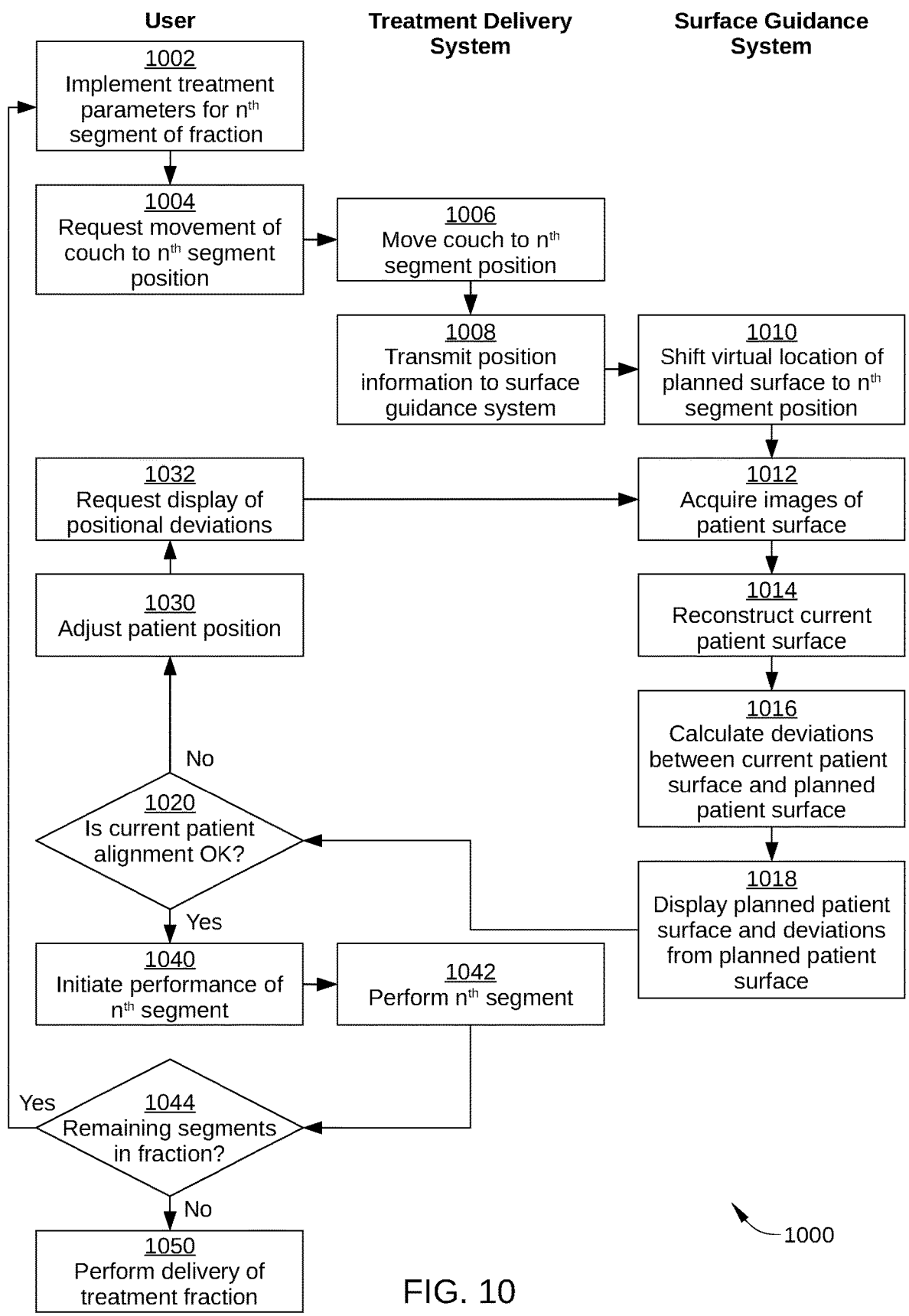
FIG. 10 sets forth a flowchart of a method for a radiotherapy system, according to one or more embodiments.

FIG. 10 sets forth a flowchart of a method 1000 for a radiotherapy system, according to one or more embodiments. In some embodiments, method 1000 can be performed as part of a specific radiotherapy session or radiotherapy treatment fraction. Method 1000 may include one or more operations, functions, or actions as illustrated by one or more of blocks 1002-1050. Although the blocks are illustrated in a sequential order, these blocks may be performed in parallel, and/or in a different order than those described herein. Also, the various blocks may be combined into fewer blocks, divided into additional blocks, and/or eliminated based upon the desired implementation. Although method 1000 is described in conjunction with treatment delivery system 200 and FIGS. 1-6, persons skilled in the art will understand that performance of method 1000 by any suitably configured radiotherapy system is within the scope of the present embodiments.

In some embodiments, prior to method 1000, a user, such as a radiation therapist, sets up a patient while couch 207 is at the ALIGN position, confirms that the current patient positioning (e.g., pose and alignment) is within allowable deviation thresholds, and requests movement of couch 207 from the ALIGN position to the LOAD position. Treatment delivery system 200 moves couch 207 to the LOAD position, surface guidance system 140 displays deviations of the current patient surface from the reference patient surface, and the user confirms that the current patient positioning is still within allowable deviation thresholds, so that X-ray imaging of the patient can be performed. Further, in some embodiments, prior to method 1000, day-of-treatment imaging is performed, for example as described above in conjunction with FIG. 8.

In step 1002, the user implements treatment parameters of treatment delivery system 200 for one of multiple segments of a radiotherapy treatment fraction. For example, the user may select pertinent treatment beam parameter values (such as beam energy, couch position values, and the like) so that treatment delivery system 200 can perform a specific segment of the radiotherapy treatment fraction on a region of patient anatomy, such as the target volume 309 for that specific segment. In some embodiments, a different target volume 309 is treated in each specific segment by changing the position of couch 207. Thus, in such embodiments, in each segment, couch 207 is located at a different treatment position relative to treatment delivery system 200. In such embodiments, N different segments are performed with couch 207 located at N different treatment positions. Thus, in such embodiments, in step 1002 the user inputs the pertinent treatment parameter values for the nth segment of the radiotherapy treatment fraction.

In step 1004, the user requests movement of couch 207 to the couch position for the nth segment of the radiotherapy treatment fraction, for example via one or more user inputs to treatment delivery system 200. In step 1006, treatment delivery system 200 moves couch 207 to the couch position for the nth segment. In step 1008, treatment delivery system 200 transmits position information to surface guidance system 140, for example via a suitable API. In some embodiments, the position information includes couch shift coordinates that indicate a displacement of the couch from the previous couch position to the current couch position. In some embodiments, the couch shift coordinates include relative couch shift values, and in other embodiments, the couch shift coordinates include absolute couch position values.

In step 1010, surface guidance system 140 shifts the virtual location of the reference patient surface from the previous couch position (e.g., the couch position for the n-1$^{th}$ segment) to the current couch position (e.g., the couch position for the n$^{th}$ segment). Based on the position information received from treatment delivery system 200, surface guidance system 140 can shift the virtual location of the reference patient surface relative to treatment delivery system 200 vertically, horizontally, and/or longitudinally, and rotate the virtual position of the reference patient surface relative to treatment delivery system 200 about one or more axes as appropriate.

In step 1012, surface guidance system 140 acquires images or other image information for the current patient surface, for example, from each patient-monitoring sensor 209 included in surface guidance system 140. In step 1014, surface guidance system 140 reconstructs a current patient surface based on the acquired images or other image information. In step 1016, surface guidance system 140 calculates positional deviations (e.g., rotational and translational offsets) between the current patient surface and the reference patient surface. In step 1018, surface guidance system 140 displays deviations of the current patient surface from the reference patient surface, for example via output device 212.

In step 1020, the user determines whether the current patient positioning is within allowable deviation thresholds. In some embodiments, the user makes such a determination based on the deviations being displayed in real-time by surface guidance system 140. If yes, method 1000 proceeds to step 1040; if no, method 1000 proceeds to step 1030. In step 1030, the user adjusts the position, alignment, and/or pose of the patient. For example, in step 1030 the user can view output device 212 while adjusting the position, alignment, and/or pose of the patient.

In step 1030, the user requests display of positional deviations between the current patient surface and the planned patient surface, for example via an input to surface guidance system 140. Alternatively, in some embodiments, surface guidance system 140 initiates or continues real-time surface monitoring in response to detecting the presence of a patient on couch 207. In response, surface guidance system 140 performs another iteration of steps 1012-1018 as shown.

Step 1040 is performed in response to the user determining that the current patient positioning is within allowable deviation thresholds in step 736. In step 1040, the user initiates performance of the segment, for example via one or more user inputs to treatment delivery system 200. In step 1042, treatment delivery system 200 performs the $n^{th}$ segment in response to the user input(s).

In step 1044, the user determines whether there are any remaining segments to be performed. If yes, method 1000 returns to step 1002; if no, method 1000 proceeds to step 1050 and terminates.

Example Computing Device

Figure 11:
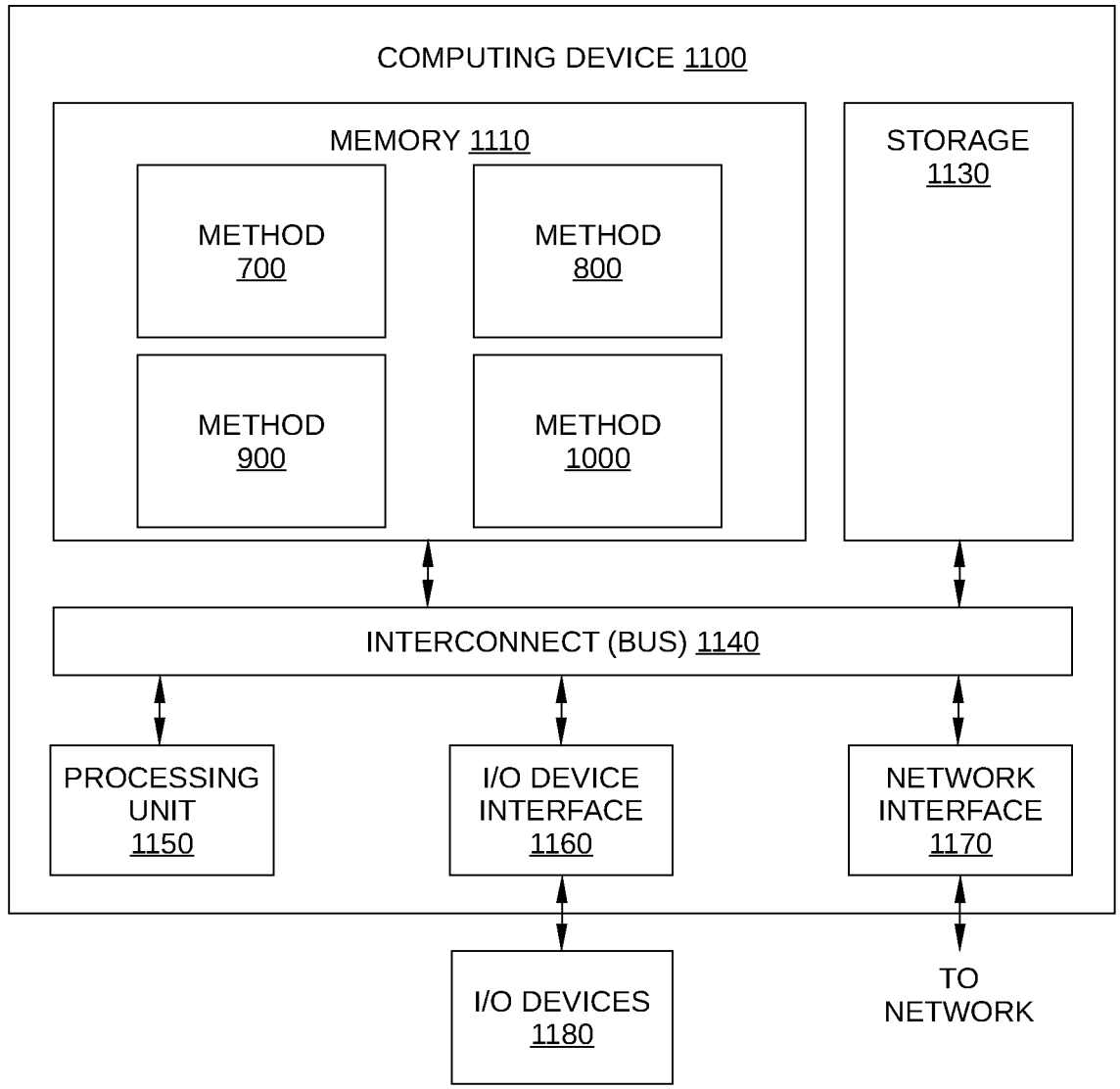
FIG. 11 is an illustration of a computing device configured to perform various embodiments.

FIG. 11 is an illustration of computing device 1100 configured to perform various embodiments described herein. For example, in some embodiments, computing device 1100 can be implemented as image acquisition and treatment control computer 206 and/or remote control console 210 in FIG. 2 and/or a computing device associated with treatment simulation and planning system 120, treatment delivery system 130, and/or surface guidance system 140 in FIG. 1. Computing device 1100 may be a desktop computer, a laptop computer, a smart phone, or any other type of computing device suitable for practicing one or more embodiments of the present disclosure. In operation, computing device 1100 is configured to execute instructions associated with method 700, method 800, method 900 and/or method 1000, as described herein. It is noted that the computing device described herein is illustrative and that any other technically feasible configurations fall within the scope of the present disclosure.

As shown, computing device 1100 includes, without limitation, an interconnect (bus) 1140 that connects a processing unit 1150, an input/output (I/O) device interface 1160 coupled to input/output (I/O) devices 1180, memory 1110, a storage 1130, and a network interface 1170. Processing unit 1150 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In general, processing unit 1150 may be any technically feasible hardware unit capable of processing data and/or executing software applications, including method 700, method 800, method 900 and/or method 1000.

I/O devices 1180 may include devices capable of providing input, such as a keyboard, a mouse, a touch-sensitive screen, and so forth, as well as devices capable of providing output, such as a display device and the like. Additionally, I/O devices 1180 may include devices capable of both receiving input and providing output, such as a touchscreen, a universal serial bus (USB) port, and so forth. I/O devices 1180 may be configured to receive various types of input from an end-user of computing device 1100, and to also provide various types of output to the end-user of computing device 1100, such as displayed digital images or digital videos. In some embodiments, one or more of I/O devices 1180 are configured to couple computing device 1100 to a network and/or to other computing devices.

Memory 1110 may include a random access memory (RAM) module, a flash memory unit, or any other type of memory unit or combination thereof. Processing unit 1150, I/O device interface 1160, and network interface 1170 are configured to read data from and write data to memory 1110. Memory 1110 includes various software programs that can be executed by processor 1150 and application data associated with said software programs, including method 700, method 800, method 900 and/or method 1000.

Example Computer Program Product

Figure 12:
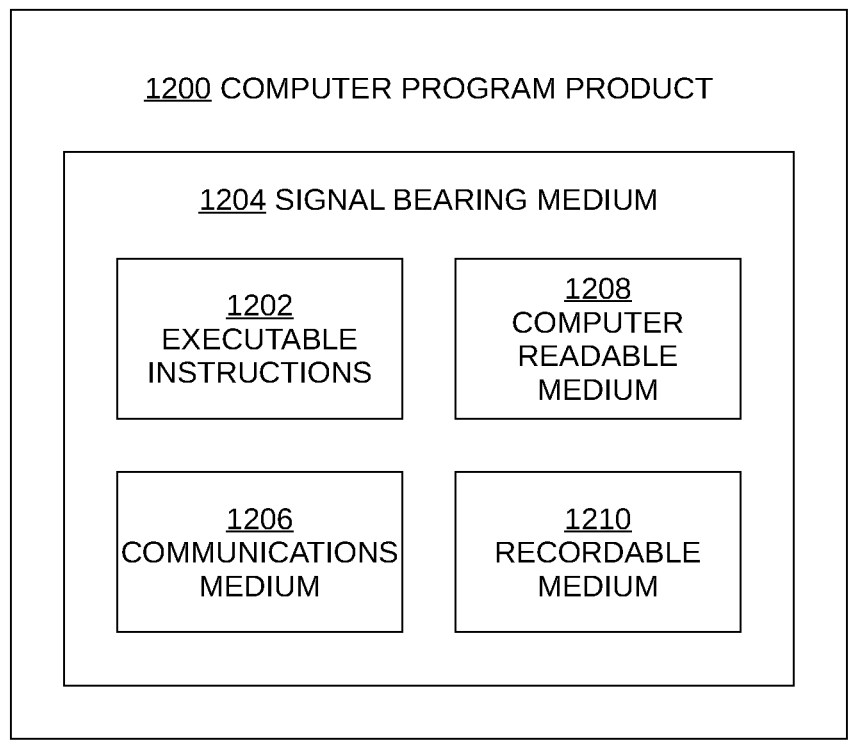
FIG. 12 is a block diagram of an illustrative embodiment of a computer program product for implementing one or more embodiments.

FIG. 12 is a block diagram of an illustrative embodiment of a computer program product 1200 for implementing a method for reducing scatter in an X-ray projection image, according to various embodiments. Computer program product 1200 may include a signal bearing medium 1204. Signal bearing medium 1204 may include one or more sets of executable instructions 1202 that, when executed by, for example, a processor of a computing device, may provide at least the functionality described above with respect to FIGS. 1-10.

In some implementations, signal bearing medium 1204 may encompass a non-transitory computer readable medium 1208, such as, but not limited to, a hard disk drive, a Compact Disc (CD), a Digital Video Disk (DVD), a digital tape, memory, etc. In some implementations, signal bearing medium 1204 may encompass a recordable medium 1210, such as, but not limited to, memory, read/write (R/W) CDs, R/W DVDs, etc. In some implementations, signal bearing medium 1204 may encompass a communications medium 1206, such as, but not limited to, a digital and/or an analog communication medium (e.g., a fiber optic cable, a waveguide, a wired communications link, a wireless communication link, etc.). Computer program product 1200 may be recorded on non-transitory computer readable medium 1208 or another similar recordable medium 1210.

In sum, embodiments described herein enable simplified workflows for a radiation therapist. Specifically, the workflows enabled by the embodiments obviate the need for a user to provide inputs synchronizing certain operations of a treatment delivery system and an associated surface guidance system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method for a treatment delivery system, the method comprising:
   transmitting, to a surface guidance system, a first signal indicating that delivery of radiation is beginning to a region of patient anatomy, wherein the radiation includes a first portion and a second portion;
   after delivering the first portion to the region, receiving a second signal from the surface guidance system, wherein the second signal is based on a reference surface generated in response to the first signal;
   in response to the second signal, halting delivery to the region of the second portion of the radiation.

2. The computer-implemented method of claim 1, wherein the first signal includes position information for a couch of the treatment delivery system.

3. The computer-implemented method of claim 2, wherein the position information indicates a location of the couch relative to the treatment delivery system.

4. The computer-implemented method of claim 1, wherein the second signal is an interrupt signal that is generated by the surface guidance system.

5. The computer-implemented method of claim 1, wherein the second signal is generated by the surface guidance system in response to a deviation of a current patient surface from a reference patient surface.

6. The computer-implemented method of claim 5, wherein the reference patient surface is based on image information for the patient acquired prior to delivery of the first portion.

7. The computer-implemented method of claim 5, wherein the reference patient surface is based on image information for the patient acquired in response to the first signal.

8. The computer-implemented method of claim 5, wherein the deviation is caused by displacement of at least a portion of the current patient surface relative to a treatment isocenter of the treatment delivery system.

9. The computer-implemented method of claim 8, wherein the deviation is determined by the surface guidance system.

10. The computer-implemented method of claim 1, wherein the radiation is associated with a treatment beam or an imaging beam.

11. The computer-implemented method of claim 1, wherein the combination of the first portion and the second portion comprises a treatment fraction for the patient.

12. A system, comprising:
    a treatment delivery device; and
    a controller configured to perform the steps of:
      transmitting, to a surface guidance system, a first signal indicating that delivery of radiation by the treatment delivery device is beginning to a region of patient anatomy, wherein the radiation includes a first portion and a second portion;
      after delivering the first portion to the region, receiving a second signal from the surface guidance system, wherein the second signal is based on a reference surface generated in response to the first signal; and
      in response to the second signal, halting delivery to the region of the second portion of the radiation.

13. The system of claim 12, wherein the first signal includes position information for a couch of the treatment delivery device.

14. The system of claim 13, wherein the position information indicates a location of the couch relative to the surface guidance system.

15. The system of claim 12, wherein the second signal is an interrupt signal that is generated by the surface guidance system.

16. The system of claim 12, wherein the second signal is generated by the surface guidance system in response to a deviation of a current patient surface from a reference patient surface.

17. The system of claim 16, wherein the reference patient surface is based on image information for the patient acquired prior to delivery of the first portion.

18. The system of claim 16, wherein the reference patient surface is based on image information for the patient acquired in response to the first signal.

19. The system of claim 16, wherein the current patient surface is based on image information acquired during delivery of the first portion.

20. The system of claim 16, wherein the deviation is caused by displacement of at least a portion of the current patient surface relative to a treatment isocenter of the treatment delivery device.

* * * * *